United States Patent
Venkata et al.

(10) Patent No.: US 6,854,044 B1
(45) Date of Patent: Feb. 8, 2005

(54) BYTE ALIGNMENT CIRCUITRY

(75) Inventors: Ramanand Venkata, San Jose, CA (US); Chong H. Lee, San Ramon, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 10/317,262

(22) Filed: Dec. 10, 2002

(51) Int. Cl.[7] .............................................. G06F 12/00
(52) U.S. Cl. .................................... 711/201; 341/101
(58) Field of Search ............................... 341/101, 100, 341/67; 711/20, 201; 710/20, 22, 71; 712/300; 370/516; 375/137; 326/39; 395/425

(56) References Cited

U.S. PATENT DOCUMENTS 5,297,242 A * 3/1994 Miki ........................... 710/22

OTHER PUBLICATIONS

U.S. patent application Ser. No. 09/805,843, Aung et al., filed Mar. 13, 2001.
U.S. patent application Ser. No. 10/093,785, Lee et al., filed Mar. 6, 2002.
U.S. patent application Ser. No. 10/195,229, Venkata et al., filed Jul. 11, 2002.
U.S. patent application Ser. No. 10/273,899, Venkata et al., filed Oct. 16, 2002.

* cited by examiner

*Primary Examiner*—Brian Young
*Assistant Examiner*—Joseph Lauture
(74) *Attorney, Agent, or Firm*—Fish & Neave LLP; Robert R. Jackson; Hong S. Lin (57) ABSTRACT

Circuitry for locating the boundaries between bytes in a data stream is only selectively enabled to find a possible new byte alignment by a control signal. After the byte alignment circuitry has found a byte alignment, it outputs byte-aligned data and a first status signal indicating the presence of such data. If the byte alignment circuitry subsequently detects information that suggests a possible need for a new or changed byte alignment, it outputs a second status signal to that effect. However, the byte alignment circuitry does not actually attempt to change its byte alignment until enabled to do so by the control signal. Programmable logic circuitry or other utilization circuitry is typically provided to receive the outputs of the byte alignment circuitry and to selectively provide the control signal.

21 Claims, 6 Drawing Sheets

BYTE ALIGNMENT CIRCUITRY

BACKGROUND OF THE INVENTION

This invention relates to data communication, and more particularly to circuitry for receiving data signals that have been communicated from a data signal source.

Data is frequently transmitted serially. Typically the data represents bytes of information that are being transmitted one after another. The usual definition of a byte is eight bits, but as used herein "byte" can refer to any plural number of bits such as eight bits, nine bits, ten bits, 11 bits, or fewer or more than these numbers of bits. When the data is received, one task that the receiving circuitry must typically perform is to find the boundaries between the successive bytes in the received serial bit stream. This may be referred to as "byte alignment" or "byte synchronization".

To facilitate byte alignment, it is typical to transmit special bytes at the start of a packet of bytes of data. The receiver circuitry looks for the special byte pattern in the incoming data. When the receiver circuitry finds the special byte pattern, it knows where the boundaries between subsequent bytes are. This makes it possible for the receiver circuitry to properly handle the subsequent bytes of data.

A problem that can occur with known byte alignment circuitry is the following. It is difficult or impossible for such circuitry, once aligned, to properly deal with subsequent receipt of the special byte pattern, especially if that pattern is received out of alignment with what has already been determined to be proper byte alignment. Such an out-of-alignment special byte pattern may be due to such circumstances as: (1) the special byte pattern is not really a special byte, but just some bits in one data byte followed by some bits in the succeeding data byte that together happen to have the same pattern as a special byte; or (2) byte alignment has been lost, and byte alignment should be re-established based on the newly received special bytes.

SUMMARY OF THE INVENTION

Byte alignment circuitry in accordance with the invention typically includes a data input, a control input, a data output, a first status output indicating when a byte alignment has been determined, and a second status output indicating a possible need for a new byte alignment. The byte alignment circuitry is enabled to possibly change byte alignment by a control signal applied to the control input.

The byte alignment circuitry does not actually change its byte alignment just because it detects some byte-alignment-type information that is not consistent with the current byte alignment. Instead, it continues to operate in accordance with the current byte alignment (e.g., continuing to output the first status signal and byte-aligned data). It does, however, also output the second status signal under these circumstances. Utilization circuitry that receives outputs of the byte alignment circuitry detects the second status signal and can determine whether or not to produce the control signal that will enable the byte alignment circuitry to locate a possibly new byte alignment. Whenever the byte alignment circuitry is attempting to locate a byte alignment, it preferably suspends outputting the first status signal and byte-aligned data. These outputs are resumed when byte alignment is established again. Resumption of the first status signal can be used to end application of the control signal to the byte alignment circuitry.

Further features of the invention, its nature and various advantages will be more apparent from the accompanying drawings and the following detailed description.

DETAILED DESCRIPTION

Figure 1:
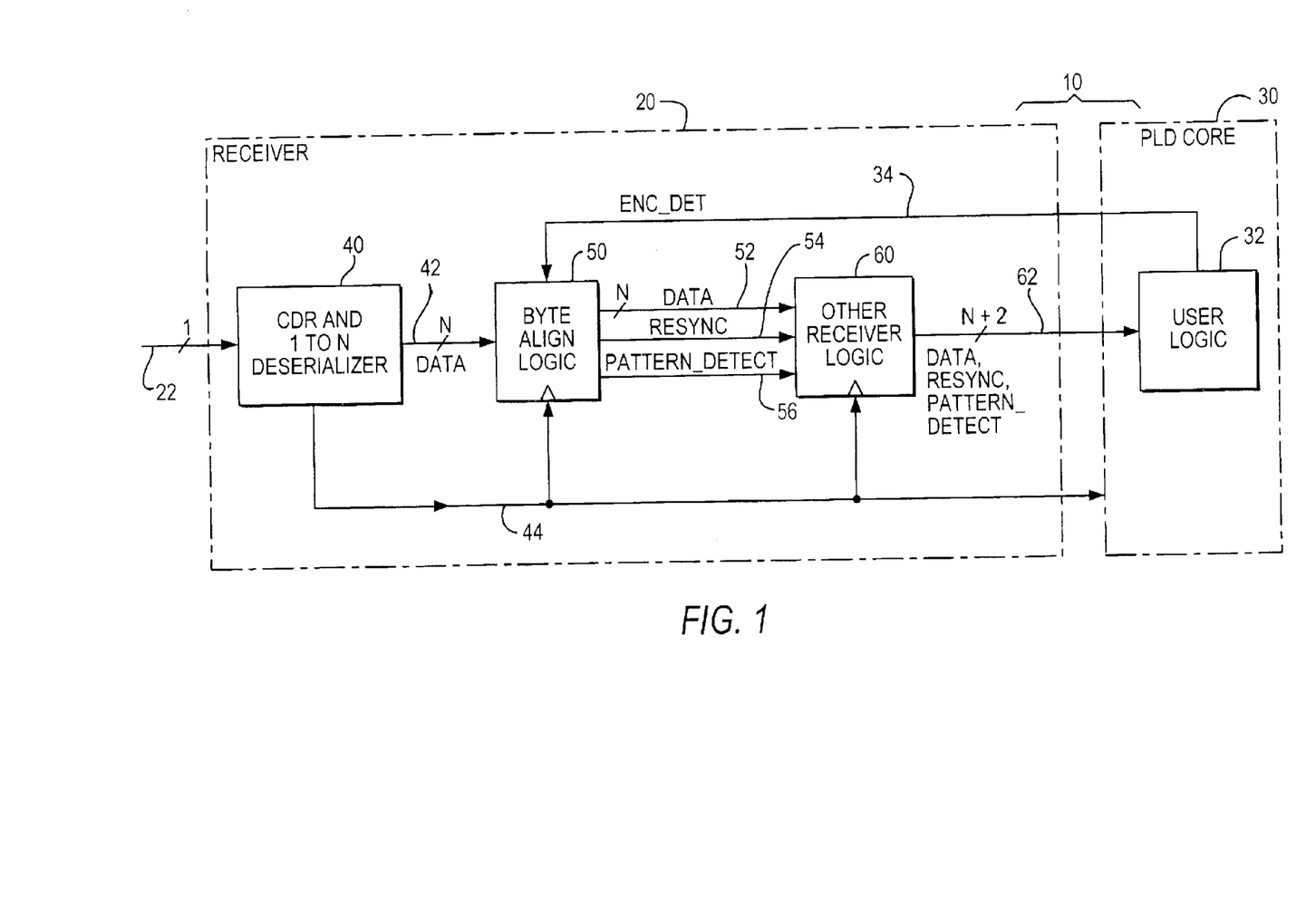
FIG. 1 is a simplified schematic block diagram of an illustrative embodiment of circuitry in accordance with the invention.

The illustrative embodiment shown in FIG. 1 is in the context of programmable logic device ("PLD") circuitry 10 that includes receiver circuitry 20 and PLD core circuitry 30. PLD 10 is typically (although not necessarily) a single integrated circuit. (Alternatively, circuitry 10 could be, for example, a multi-chip module including two or more separate integrated circuits.) The illustrative context shown in FIG. 1 is by no means the only possible context. For example, instead of being used with PLD circuitry (like 30), receiver circuitry 20 could instead be used with many other types of utilization circuitry such as microprocessor circuitry. Many other possible contexts for the invention will occur to those skilled in the art having the benefit of the disclosure contained in this specification. The following description (e.g., of FIG. 1, etc.) will therefore be understood to be illustrative and not limiting.

Receiver 20 receives a serial bit stream signal via lead 22. This signal is applied to clock data recovery ("CDR") and 1 to N deserializer circuitry 40 in receiver circuitry 20. Use of CDR-type signalling (in which data information and clock information are combined in one signal) is optional. Other types of serial data signalling can be used instead, if desired. Even deserialization is optional. The down-stream circuitry could continue to work with serial data in which the byte boundaries have been determined in accordance with this invention. But assuming that circuitry-40-types of signal processing are employed, more information about illustrative suitable circuitry and components for doing these types of signal processing can be found in such references as Aung et al. U.S. patent application Ser. No. 09/805,843, filed Mar. 13, 2001, Lee et al. U.S. Pat. No. 6,650,140, Venkata et al. U.S. Pat. No. 6,750,675, and Venkata et al. U.S. patent application Ser. No. 10/273,899, filed Oct. 16, 2002.

It is not believed that the material in these references is essential for understanding and/or practicing any aspect of the present invention. But if additional information is desired or needed for any purpose, it is available from one or more of these references.

CDR circuitry 40 recovers from the incoming serial data a recovered clock signal and a recovered (or retimed) serial data signal. The deserializer portion of circuitry 40 converts the recovered (or retimed) serial data signal to a plurality N of parallel data signals on leads 42. N is typically the number of bits in a byte, but this is not absolutely necessary; and in any event, the N signals on leads 42 are not necessarily aligned with byte boundaries in the incoming data. Circuitry 40 also outputs a clock signal on lead 44 that is typically derived from the recovered clock signal and synchronized with the data on leads 42. For example, assuming that the number of leads 42 is equal to the number of bits in a byte, the clock signal on lead 44 typically has frequency equal to the byte rate of the system. The signal on lead 44 may therefore be referred to as a "byte rate clock" or a "slow speed parallel clock."

The signals on leads 42 are applied to byte alignment logic circuitry 50. This circuitry also receives (1) the clock signal on lead 44, and (2) an enable SYNC_PAT detect and align signal ("ENC_DET") on lead 34 from the user logic circuitry 32 in PLD core 30. When enabled by the ENC_DET signal (sometimes referred to elsewhere herein as the "control signal"), circuitry 50 is enabled to search for the special bytes ("SYNC_PAT") in the data received via leads 42 in order to determine where the boundaries between bytes are. For example, circuitry 50 may be constructed to always contain the two most recent successive outputs of circuitry 40 in parallel, and to look for an occurrence of SYNC_PAT in any of the N different groups of N adjacent bits in that data during each cycle of the clock signal on lead 44. (This example assumes that N is equal to the number of bits in a byte.) Circuitry 50 may include state machine circuitry that requires SYNC_PAT to be found in the same place in the data a predetermined number of times within a predetermined time interval (e.g., a predetermined number of cycles of the clock signal on lead 44). As an alternative to including such state machine circuitry in circuitry 50, it may be included in user logic 32, which would facilitate making it programmable (although even when included in circuitry 50, certain aspects of the state machine (such as various parameter values) may be programmable).

When the predetermined criteria for adequate detection of SYNC_PAT are satisfied, circuitry 50 outputs a PATTERN_DETECT signal on lead 56. (This signal is sometimes referred to elsewhere herein as the "first status signal.") Circuitry 50 also then begins to output aligned bytes of data on N leads 52. (The RESYNC signal on lead 54 is described later.) The PATTERN_DETECT signal on lead 56 allows other circuitry 60 in receiver 20 to begin to further process the byte-aligned data on leads 52 and to pass that data on to PLD core 30 (especially user logic circuitry 32) via leads 62. The RESYNC and PATTERN_DETECT signals are also preferably passed on via leads 62. Circuitry 60 may perform various conventional or previously disclosed operations on the byte-aligned data in preparation for passing that data on to user logic 32. Such operations may include any or all of eight-bit-to-ten-bit decoding, decryption, clock rate matching, phase compensation, channel deskew, and/or the like. The several references mentioned earlier in this specification provide more information about several types of operations that may be performed by circuitry 60. On the other hand, the presence of circuitry 60 is entirely optional, and it can be completely omitted if desired. If circuitry 60 is omitted, the outputs of circuitry 50 may be applied directly or substantially directly to user logic 32.

After circuitry 50 has begun to thus produce byte-aligned data and a corresponding PATTERN_DETECT signal, the ENC_DET signal is preferably suspended by user logic 32. This prevents circuitry 50 from attempting to establish a new byte alignment. However, circuitry 50 does continue to look for SYNC_PAT in the data it receives. In the event that circuitry 50 finds SYNC_PAT not aligned with the current byte alignment, circuitry 50 outputs a RESYNC signal to indicate that this has occurred. (This signal is sometimes referred to elsewhere herein as the "second status signal.")

Again, state machine circuitry in circuitry 50 (or user logic 32) may be used to establish additional criteria (such as a certain amount of sufficiently frequent repetition) that must be satisfied before a RESYNC signal is output. The RESYNC signal is passed on to user logic 32 along with the data and PATTERN_DETECT signals. Statements made earlier about various state machine options apply equally to any state machine functions mentioned in this paragraph.

There are various ways that the signals described above can be used, preferably by user logic 32. For example, the RESYNC signal can be monitored for occurrences of SYNC_PAT. If other available information or conditions make it clear that RESYNC has been asserted falsely (e.g., because a pattern resembling SYNC_PAT has occurred across still properly aligned byte boundaries), the RESYNC signal can be ignored. Ignoring RESYNC means not asserting ENC_DET, thereby preventing circuitry 50 from changing its already established byte alignment. Alternatively, if it appears that an assertion of RESYNC may truly indicate a need for a new byte alignment, user logic 32 can assert ENC_DET in response to the RESYNC signal, thereby enabling circuitry to search for and establish a new byte alignment. Assertion of PATTERN_DETECT is preferably suspended when ENC_DET is asserted and until circuitry 50 again determines that it has found a byte alignment. The same is true for the output of byte-aligned data via leads 52. Yet another possible operating mode is assertion of ENC_DET whenever PATTERN_DETECT is not being asserted.

As a further example of the foregoing, SONET frames start with the SYNC_PAT A1A2, which is a specific bit pattern defined by the SONET standard. Since A1A2 can also occur anywhere in a frame, the user can monitor RESYNC and determine (based on prior knowledge of the frame size) whether a real change in byte boundary has occurred. If so, the user can assert ENC_DET and wait for re-alignment to the new byte boundary, as indicated by re-assertion of PATTERN_DETECT. To operate in this way, the circuitry (e.g., user logic 32) keeps track of how many bytes have been received in a frame. If RESYNC occurs before the expected predetermined number of bytes characteristic of a completed frame has been received, RESYNC is ignored and the circuitry continues to operate with the current byte alignment until the frame ends. If RESYNC occurs when the expected predetermined number of bytes for a frame has been received, RESYNC is responded to by asserting ENC_DET, which enables circuitry 50 to find a possibly new byte alignment.

An important advantage of the invention is that there is no need to place restrictions on the data encoding on the transmit side in order to avoid the unintended occurrence of SYNC_PAT across byte boundaries. Circuitry 50 can be prevented from attempting a byte realignment in response to such unintended occurrences of SYNC_PAT by not asserting ENC_DET in response to a RESYNC signal that appears under those conditions. Customized byte synchronization mechanisms can be defined (e.g., by appropriately programming user logic 32 and/or any state machine circuitry associated with circuitry 50) without being constrained by a lack of status information (such as whether SYNC_PAT has been detected while circuitry 50 is already indicating via PATTERN_DETECT that it has already made a byte boundary determination).

Figure 2:
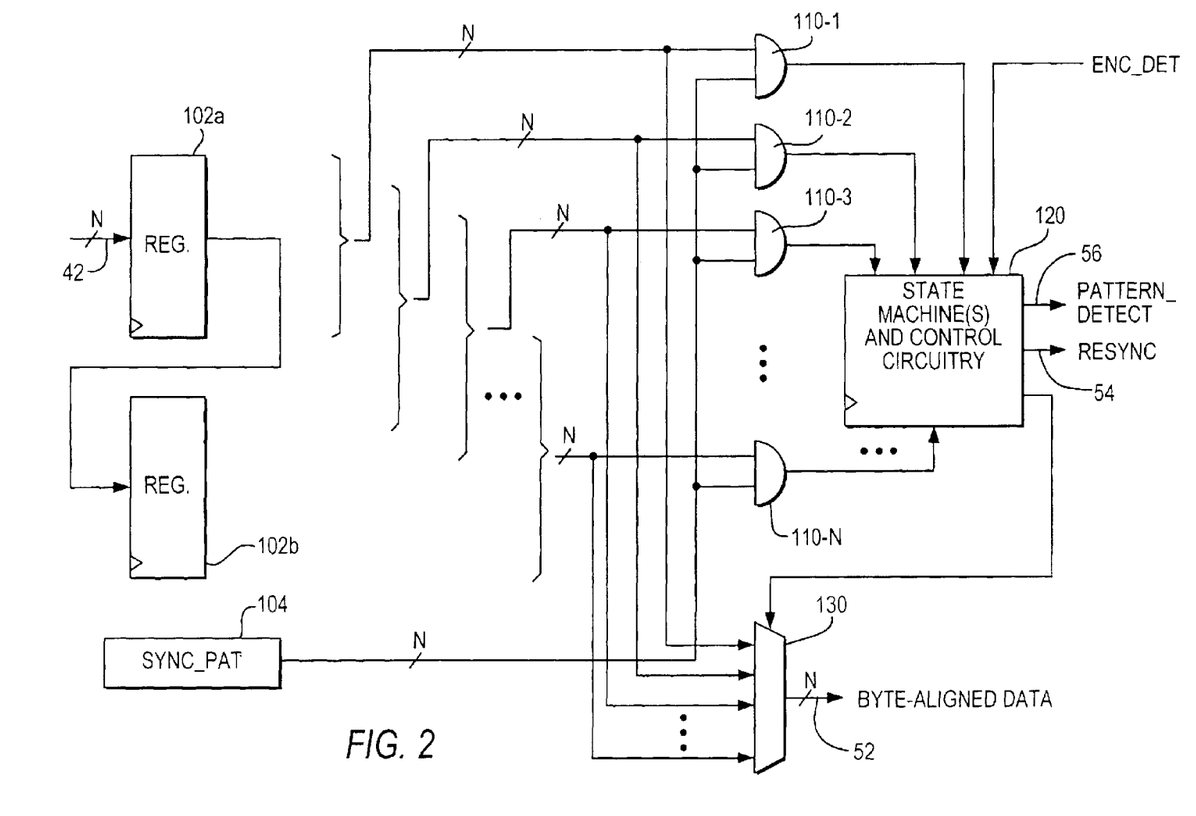
FIG. 2 is a more detailed, but still simplified, schematic block diagram of an illustrative embodiment of a portion of the circuitry of FIG. 1 in accordance with the invention.

An illustrative embodiment of byte alignment circuitry 50 is shown in more detail in FIG. 2. Register 102a stores the most recent N bits of data received via leads 42 (FIG. 1). Register 102b stores the next-most-recent N bits of data received via leads 42. Registers 102a and 102b are typically clocked by byte rate clock 44 (FIG. 1). Register 104 stores SYNC_PAT.

Each of AND gate networks 110-1, 110-2, ..., 110-N compares a respective one of N different groups of N adjacent bits from registers 102a/102b to SYNC_PAT from register 104 and produces an output signal if and only if there is a match. For example, assume that in each of registers 102a and 102b the serially most recent of the stored bits is at the top, and the bits become serially older toward the bottom of each register. (These references to serial age relate to the order in which the bits were received via lead 22 (FIG. 1).) Then AND network 110-1 compares N bits from register 102a to SYNC_PAT. AND network 110-2 compares N−1 bits from register 102a (i.e., all but the serially most recent bit in register 102a) and one bit from register 102b (i.e., the serially most recent bit in register 102b) with SYNC_PAT. AND network 110-3 compares N−2 bits from register 102a (i.e., all but the two serially most recent bits in register 102a) and two bits from register 102b (i.e., the two serially most recent bits in register 102b) with SYNC_PAT. This pattern progresses so that it concludes with AND network 110-N comparing one bit from register 102a (i.e., the serially oldest bit in register 102a) and N−1 bits from register 102b (i.e., all but the serially oldest bit in register 102b) with SYNC_PAT. In this way SYNC_PAT can be found anywhere that it may occur in the incoming data, without regard for whether circuitry 40 (FIG. 1) happens to be outputting byte-aligned data. The particular one of AND networks 110 that produces an output when SYNC_PAT is thus detected in the received data identifies how bytes are in fact aligned relative to the outputs of circuitry 40.

The outputs of all of AND networks 110 are applied to state machine(s) and control circuitry 120. ENC_DET signal 34 is also applied to circuitry 120 to enable operation of that circuitry to establish a byte alignment or to change a previously established byte alignment. Although FIG. 2 suggests that circuitry 120 is all part of circuitry 50, it will be understood that parts or all of circuitry 120 can be implemented elsewhere, such as in user logic 32 (FIG. 1). Circuitry 120 implements whatever criteria the user has selected as requirements for establishing a byte alignment. Circuitry 120 establishes the proper byte alignment when those criteria are satisfied. In particular, when a byte alignment is established, circuitry 120 outputs PATTERN_DETECT signal 56, and it also controls multiplexer network 130 to select and output the one set of inputs that network 130 is receiving in which the data is properly byte-aligned. For example, if circuitry 120 receives repeated outputs from AND network 110-3, and on that basis determines that the set of inputs to network 110-3 from registers 102a and 102b have proper byte alignment, then circuitry 120 will cause multiplexer network 130 to output the data from the portions of registers 104a and 104b that supply inputs to AND network 110-3. The outputs of multiplexer network 130 are the byte-aligned data signals on leads 52.

After a byte alignment has thus been established by circuitry 120, if circuitry 120 detects any occurrence (or any sufficiently repeated occurrence) of SYNC_PAT that is not aligned with the current byte alignment, circuitry 120 asserts its RESYNC output 54. For example, if circuitry 120 has established a byte synchronization based on repeated outputs from AND network 110-3, and it subsequently receives an output (or sufficiently repeated outputs) from one of the other AND networks (e.g., 110-2 or 110-N), then circuitry 120 asserts RESYNC to indicate that it has detected an occurrence (or occurrences) of SYNC_PAT that is (or are) not aligned with the currently established byte alignment.

Figure 3:
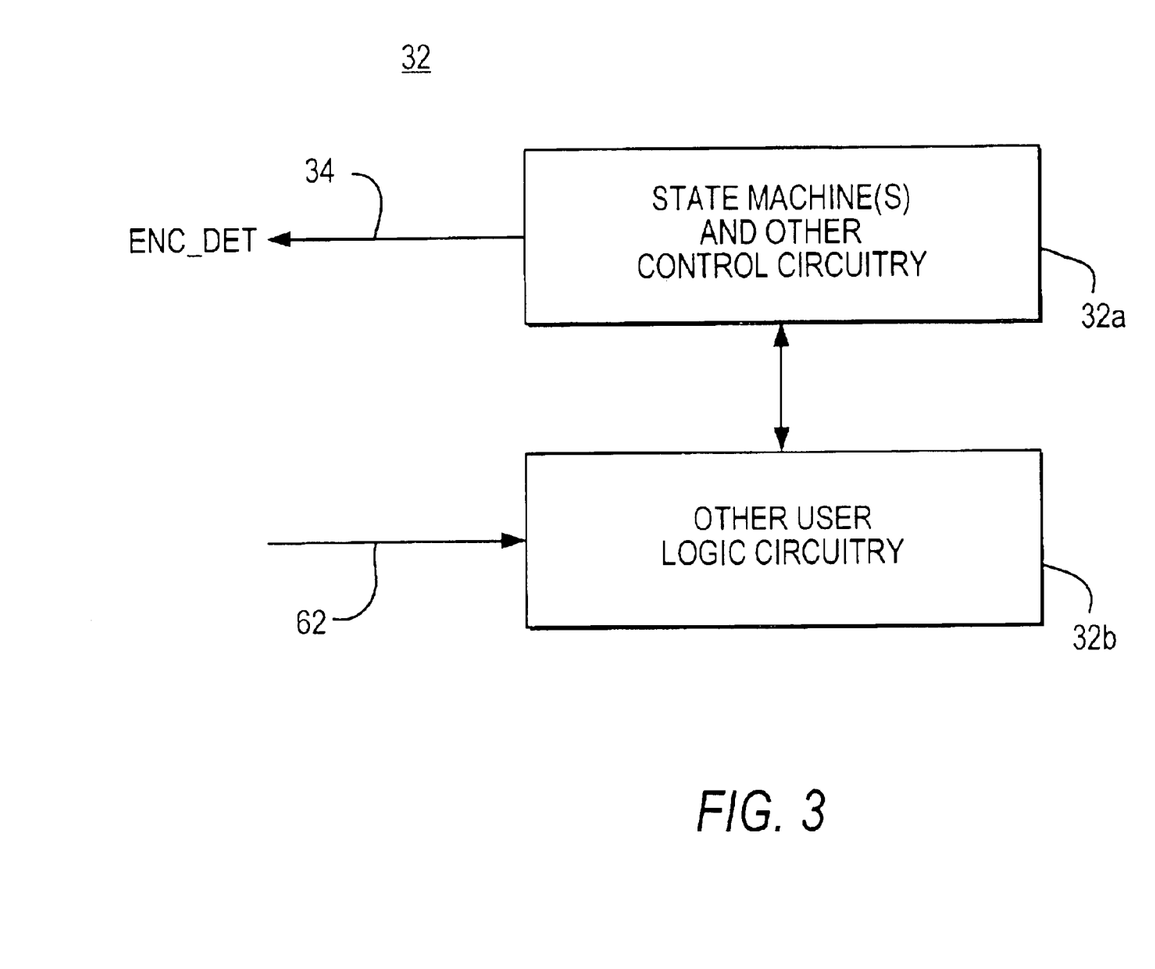
FIG. 3 is a more detailed, but still simplified, block diagram of an illustrative embodiment of another portion of the circuitry of FIG. 1 in accordance with the invention.

FIG. 3 shows that user logic 32 (FIG. 1) can include state machine(s) and other control circuitry 32a for supporting the operation of byte alignment circuitry 50 (FIG. 1) and also other user logic circuitry 32b. For example, state machine circuitry for determining when ENC_DET should be asserted to enable byte alignment circuitry 50 can be part of circuitry 32a. Alternatively or additionally, state machine type functions that are generally described herein as part of circuitry 50 can instead be included in circuitry 32a. How state machine and other control functions are allocated among the various portions of the circuitry is largely a matter of choice for the user.

Figure 4A:
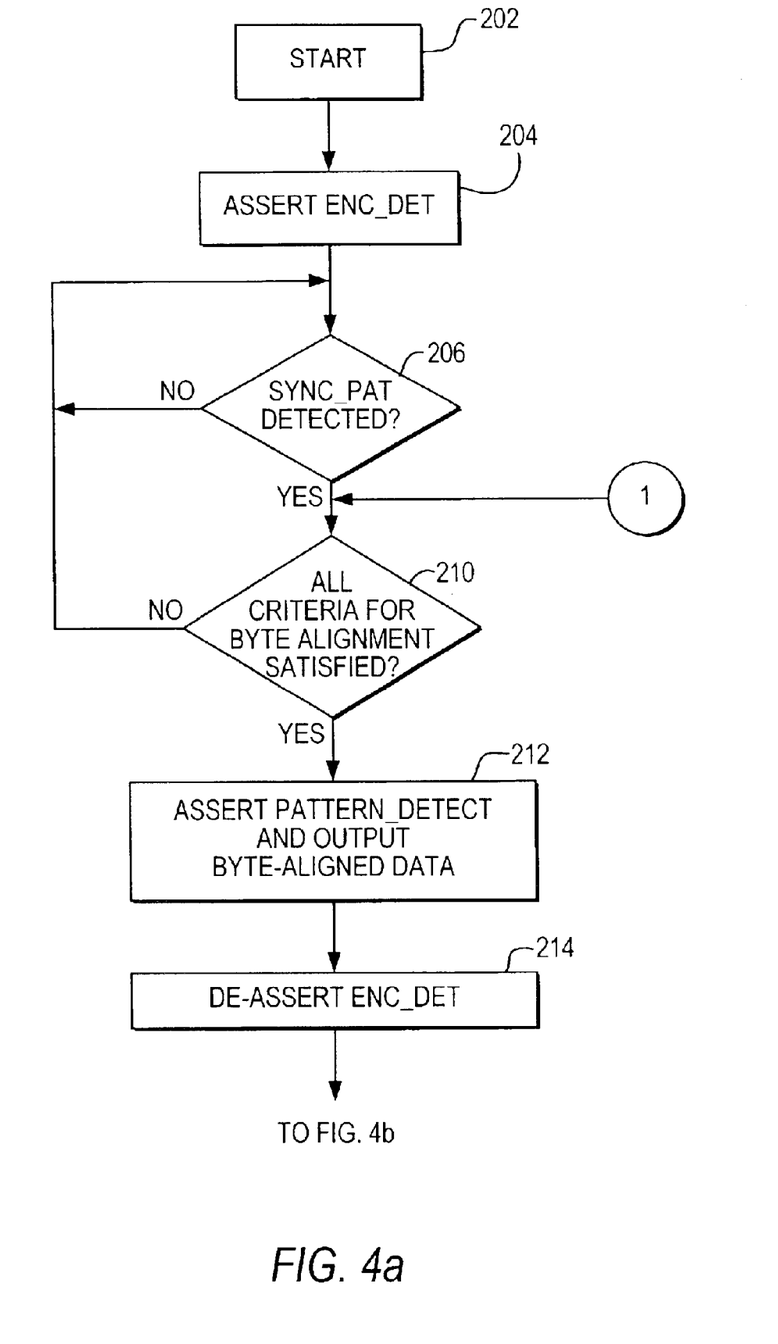
FIGS. 4a and 4b are collectively a simplified flow chart of illustrative modes of operation of circuitry of the type shown in FIG. 1 in accordance with the invention.
Figure 4B:
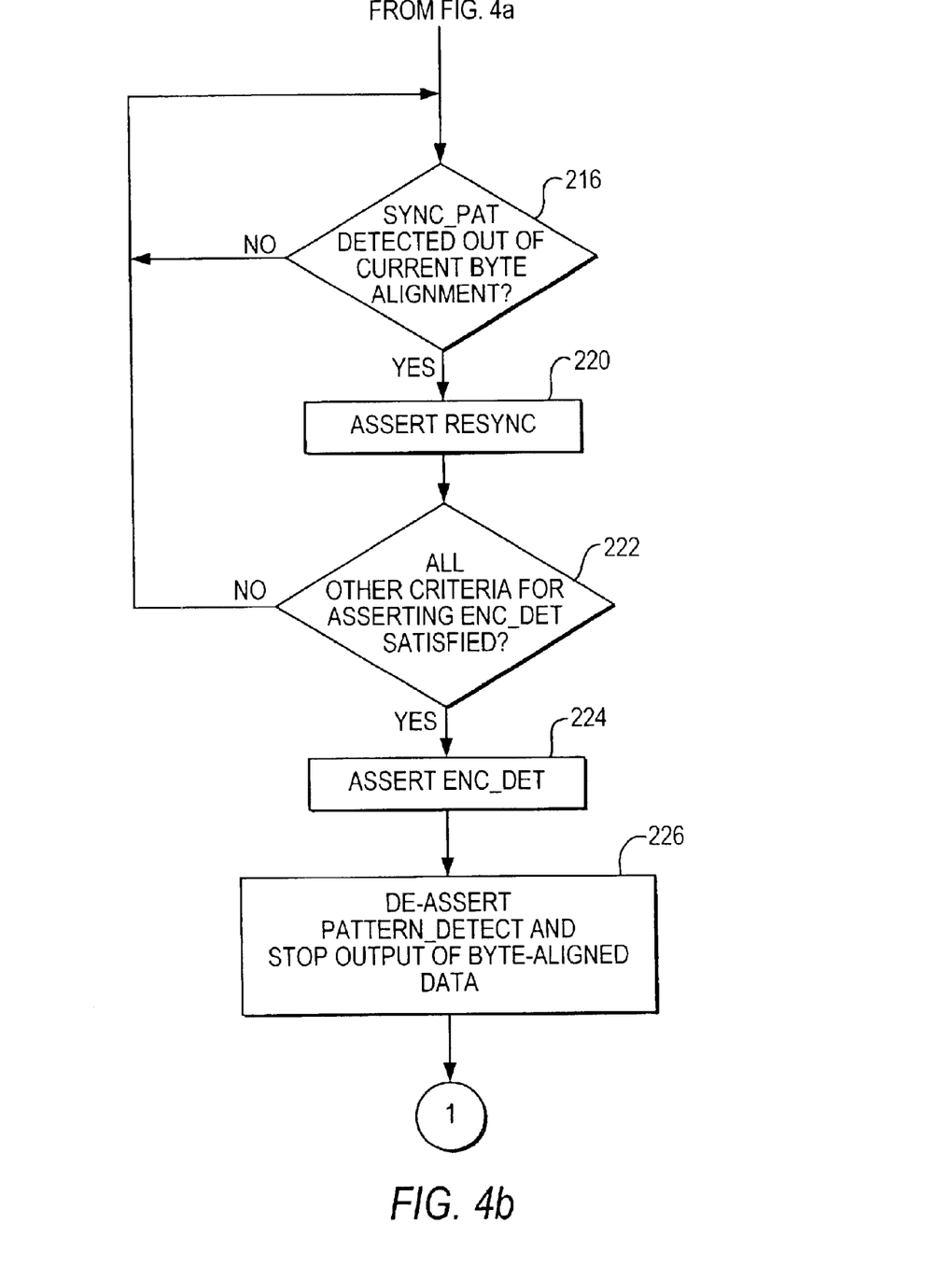

Illustrative methods of operating circuitry in accordance with the invention are shown in FIGS. 4a and 4b. These methods start with step 202 (e.g., at the start of operation of the circuitry). In step 204 the ENC_DET signal is asserted to enable byte alignment circuitry 50 (FIG. 1). Step 206 is a test performed by circuitry 50 for detection of SYNC_PAT in the received data on leads 42 (FIG. 1). Step 206 is repeated until SYNC_PAT is detected, which causes control to pass to step 210. Step 210 is a test for satisfaction of all criteria for determination of a byte alignment. For example, this may mean that a particular state machine state has been reached (e.g., as a result of detection of a sufficient number of occurrences of SYNC_PAT in the same relative position in the incoming data within a predetermined number of byte rate clock signal cycles). The state machine circuitry can be part of circuitry 50 or part of circuitry 32 or anywhere else in the circuitry. Different users may chose to employ various different criteria in step 210. Until the step 210 test is satisfied, control continues to loop back to step 206. But when the step 210 test is satisfied, control passes to step 212, in which a byte alignment is established, and consequently the PATTERN_DETECT signal is asserted and byte-aligned data is output by byte alignment circuitry 50. Also in step 214 ENC_DET is de-asserted.

Thereafter, byte alignment circuitry 50 (in addition to its other functions) continues to perform step 216 in repeating loop fashion to look for any occurrence (or occurrences) of SYNC_PAT that is (or are) not aligned with the current byte alignment. If that should occur, control passes to step 220, in which the RESYNC signal is asserted. Step 222 is then performed to determine whether all other criteria for re-asserting ENC_DET have been satisfied. If not, control does not progress beyond step 222 until the step 222 test has been satisfied. For example, control may loop back to step 216 to possibly await completion of a frame and/or to look for more occurrences of SYNC_PAT out of the current byte alignment. Like step 210, step 222 may be implemented at least in part by one or more state machines, which can be part of circuitry 50, circuitry 32, or anywhere else in the circuitry. Different users may chose to employ various different criteria in step 222.

If and when the step 222 test is satisfied, control passes to step 224, in which ENC_DET is asserted again. This causes byte alignment circuitry 50 to de-assert PATTERN_DETECT, to stop outputting byte-aligned data 52, and to look for a possibly new byte alignment. For this last purpose, control passes from step 226 back to step 210 for continued operation as has already been described.

Figure 5:
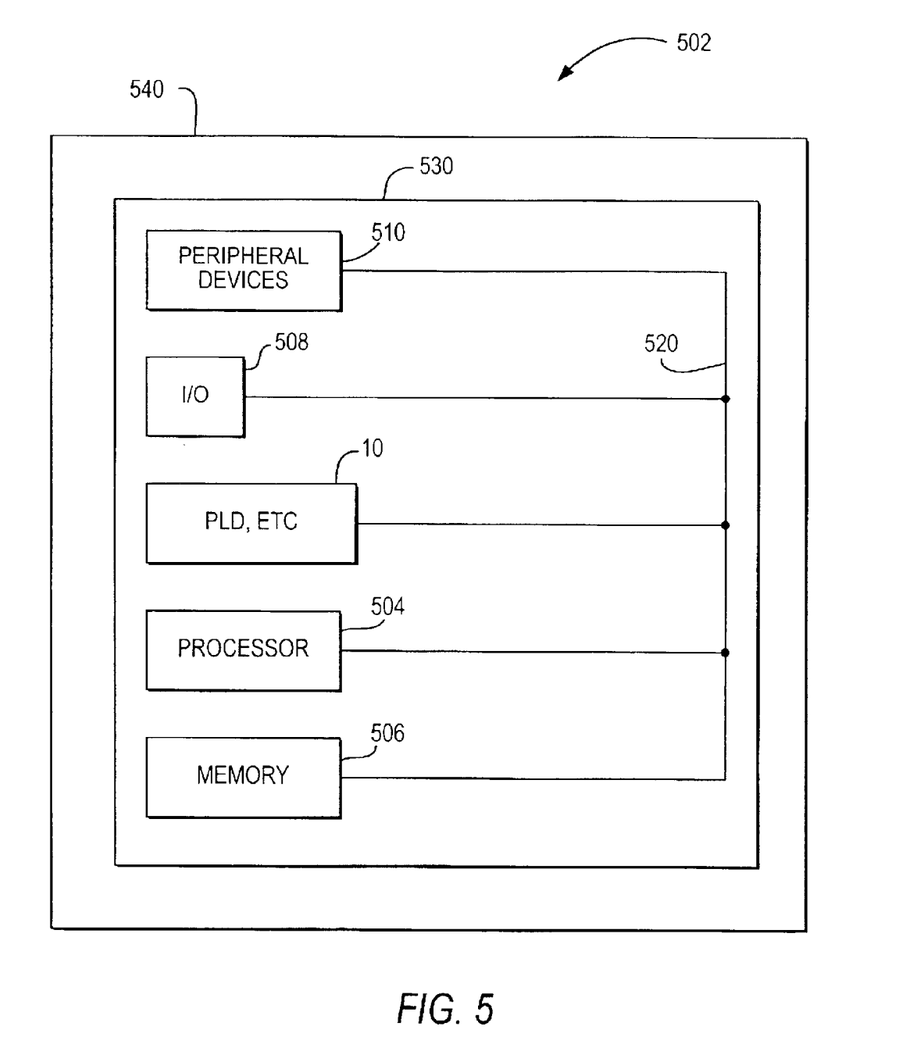
FIG. 5 is a simplified block diagram of an illustrative system employing circuitry in accordance with the invention.

FIG. 5 illustrates possible use of circuitry 10 of the type shown in FIG. 1 in a data processing system 502 in accordance with the invention. Data processing system 502 may include one or more of the following components: a processor 504, a memory 506, I/O circuitry 508, and peripheral devices 510. These components are coupled together by a system bus or other interconnections 520 and are populated on a circuit board 530 (e.g., a printed circuit board) that is contained in an end-user system 540. Communication among the various components shown in FIG. 5 and/or with external circuitry may be of the type described above in connection with FIG. 1 to any desired extent. As an addition or alternative to use of the circuitry 10 of this invention in a more or less stand-alone component 10 in FIG. 5, such circuitry may also or alternatively be provided as communication interface circuitry in any of the other components 504, 506, 508, and 510.

System 502 can be used in a wide variety of applications, such as computer networking, data networking, instrumentation, video processing, digital signal processing, or any other application where the advantage of using programmable or reprogrammable logic is desirable. Circuitry 10 (including programmable logic circuitry 30 as in FIG. 1) can be used to perform a variety of different logic functions. For example, circuitry 10 can be configured as a processor or controller that works in cooperation with processor 504. Circuitry 10 may also be used as an arbiter for arbitrating access to a shared resource in system 502. In yet another example, circuitry 10 can be configured as an interface between processor 504 and one of the other components of system 502. It should be noted that system 502 is only exemplary, and that the true scope and spirit of the invention should be indicated by the following claims.

It will be understood that the foregoing is only illustrative of the principles of the invention and that various modifications can be made by those skilled in the art without departing from the scope and spirit of the invention. For example, the circuitry can be adapted to work with "bytes" of any plural number of bits.

What is claimed is:

1. Byte alignment circuitry comprising:
    a data input;
    a control input;
    a data output;
    a first status output indicating when a byte alignment has been determined; and
    a second status output indicating a possible need for a new byte alignment, the circuitry being enabled to change byte alignment by a signal applied to the control input.

2. The circuitry defined in claim 1 wherein the data input is one of a plurality of parallel data inputs.

3. The circuitry defined in claim 2 wherein the plurality is the number of bits in a byte.

4. The circuitry defined in claim 1 wherein the data output is one of a plurality of parallel data outputs.

5. The circuitry defined in claim 4 wherein the plurality is the number of bits in a byte.

6. The circuitry defined in claim 5 wherein successive aligned bytes are output one after another via the data outputs.

7. The circuitry defined in claim 1 further comprising a clock input.

8. A digital processing system comprising:
    processing circuitry;
    a memory coupled to the processing circuitry; and
    byte alignment circuitry as defined in claim 1 coupled to the processing circuitry and the memory.

9. A printed circuit board on which is mounted byte alignment circuitry as defined in claim 1.

10. The printed circuit board defined in claim 9 further comprising:
    a memory mounted on the printed circuit board and coupled to the byte alignment circuitry.

11. The printed circuit board defined in claim 9 further comprising:
    processing circuitry mounted on the printed circuit board and coupled to the byte alignment circuitry.

12. Circuitry for receiving and byte-aligning data comprising:
    byte alignment circuitry that is enabled by a control signal to locate byte boundaries in received data and to subsequently output byte-aligned data and a first status signal indicative of the presence of byte-aligned data, the byte alignment circuitry further outputting a second status signal indicating a possible need for a new byte alignment in the event that the byte alignment circuitry detects byte alignment information that is not aligned with a current byte alignment; and
    utilization circuitry responsive to outputs of the byte alignment circuitry and selectively providing the control signal.

13. The circuitry defined in claim 12 wherein the byte-aligned data is output in parallel form.

14. The circuitry defined in claim 12 wherein the utilization circuitry comprises programmable logic circuitry.

15. The circuitry defined in claim 12 wherein the utilization circuitry is adapted to output the control signal whenever the byte alignment circuitry is not outputting the first status signal.

16. The circuitry defined in claim 12 wherein the data is received in frames, each including a predetermined number of bytes preceded by byte alignment information, wherein the utilization circuitry keeps track of how many bytes it has received in a frame, and wherein the utilization circuitry ignores the second status signal unless it has received the predetermined number of bytes.

17. Circuitry for receiving and byte-aligning data comprising:
    CDR circuitry that receives a data signal that includes data information combined with clock information, and that recovers the data information separately from the clock information;
    byte alignment circuitry that is enabled by a control signal to locate byte boundaries in the recovered data information, the byte alignment circuitry outputting byte-aligned data information, a first status signal indicative of the presence of byte-aligned data information, and a second status signal indicative of a possible need to determine a new byte alignment; and
    utilization circuitry responsive to outputs of the byte alignment circuitry and providing the control signal.

18. The circuitry defined in claim 17 wherein the byte-aligned data information is output in parallel form.

19. The circuitry defined in claim 17 wherein the utilization circuitry comprises programmable logic circuitry.

20. The circuitry defined in claim 17 wherein the utilization circuitry is adapted to output the control signal whenever the byte alignment circuitry is not outputting the first status signal.

21. The circuitry defined in claim 17 wherein the data is received in frames, each including a predetermined number of bytes preceded by byte alignment information, wherein the utilization circuitry keeps track of how many bytes it has received in a frame, and wherein the utilization circuitry ignores the second status signal unless it has received the predetermined number of bytes.

* * * * *